United States Patent [19]

Becraft

[11] Patent Number: 4,893,970

[45] Date of Patent: Jan. 16, 1990

[54] HAND HELD DRILL GUIDE

[76] Inventor: Charles E. Becraft, 1640 McKinley Ct., Eugene, Oreg. 97402

[21] Appl. No.: 188,022

[22] Filed: Apr. 29, 1988

[51] Int. Cl.$^4$ .............................................. B23B 49/02
[52] U.S. Cl. ............................ 408/72 R; 408/115 R; 33/574
[58] Field of Search ................... 408/72 R, 75, 79, 97, 408/115 R; 33/574, 666, 667, 669, 557, 578, 579; 248/167; 175/220

[56] References Cited

U.S. PATENT DOCUMENTS

| | | | |
|---|---|---|---|
| 2,428,201 | 9/1947 | Cannarli et al. | 408/72 |
| 2,521,938 | 9/1950 | Nitenson | 248/176 |
| 2,798,520 | 7/1957 | Maskvlka et al. | 408/72 X |
| 3,990,623 | 11/1976 | Fortune | 248/176 X |
| 4,655,318 | 4/1987 | Bowen | 182/90 |
| 4,707,013 | 11/1983 | Vranish et al. | 901/37 |
| 4,730,959 | 3/1988 | Aerni et al. | 408/72 R X |

FOREIGN PATENT DOCUMENTS 819859 9/1959 United Kingdom ................. 408/72

Primary Examiner—Z. R. Bilinsky
Assistant Examiner—Robert Schultz
Attorney, Agent, or Firm—James D. Givnan, Jr.

[57] ABSTRACT

A guide for drilling dowel receiving bores in workpiece to be joined. The guide includes a main body having flat surfaces provided with pieces of frictional material such as aluminum oxide #40 grit, cloth back facilitating retention of the guide in place on a workpiece during drilling without clamping. An opening in the main body permits alignment of a drill receiving opening with a marking on the workpiece. The guide, in conjunction with a center punch, is locatable over a drilling sight in a workpiece without reference to a workpiece edge with additional frictional material contributing toward retention of the guide in place on a workpiece remote from a workpiece edge.

4 Claims, 1 Drawing Sheet

U.S. Patent
Jan. 16, 1990
4,893,970
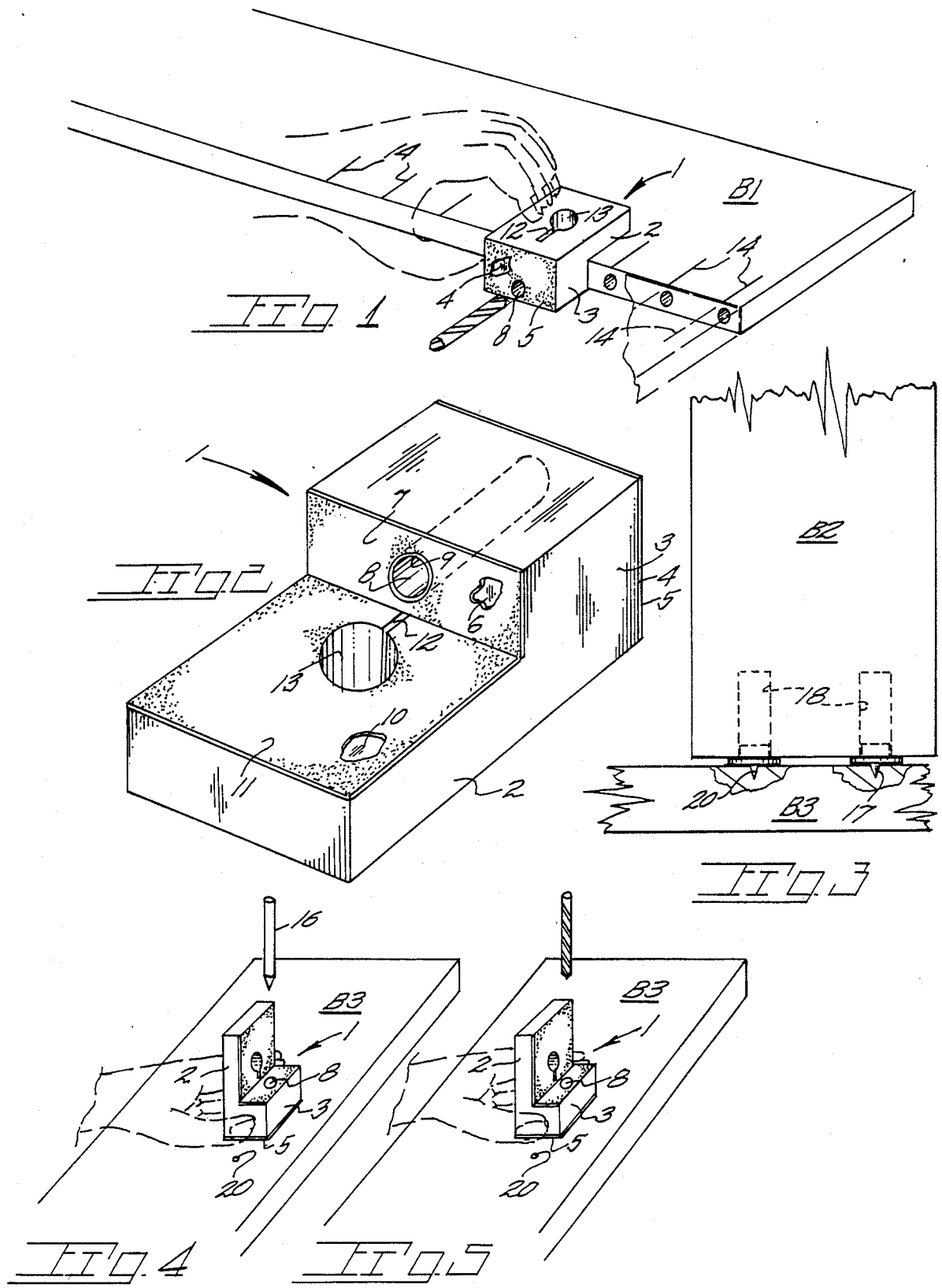

HAND HELD DRILL GUIDE

BACKGROUND OF THE INVENTION

The present invention pertains generally to woodworking tools and particularly to devices for guiding a drill bit during a precise drilling operation as in the drilling of dowel receiving bores.

In woodworking, and particularly the joining of pieces by doweling, it is necessary that the pieces to be joined have axially alignable bores to receive a common dowel. Misalignment of bores results in both waste of time and materials. It is also important that dowel receiving bores be both properly spaced.

In the prior art, U.S. Pat. No. 2,798,520 discloses a drill guide providing a pair of drill guide tubes with a sight opening for registration with a marking on a workpiece. No provision is made on the guide to aid in holding same in place on the workpiece during a drilling operation. In drilling, especially hardwoods and large bore diameters, when the drill encounters variable resistance it tends to cause lateral shifting of a drill guide hence the guide shown in U.S. Pat. No. 2,798,520 would tend to move if not clamped. Further, the drilled bores are necessarily offset from a medial sight opening in the guide to prevent drilling on marked centers. The guide shown in the patent is not usable on large surface areas but rather is limited to edge surfaces.

SUMMARY OF THE PRESENT INVENTION

The present invention is embodied in a drill guide having surfaces enhancing frictional engagement with the workpiece to the extent the guide may be held in place by hand pressure.

The guide includes planar surfaces with grit friction enhancing means such as aluminum oxide #40 grit, cloth back thereon which adhere to the workpiece without damaging the workpiece surface. Accordingly, the present guide is adapted for non-slip placement on a workpiece edge or top or bottom without the aid of a clamp which is inconvenient or simply not usable where bores are to be drilled remote from a workpiece edge. A sight opening permits alignment of a drill receiving opening with a centerline marking on the workpiece to permit the two workpieces to be joined by doweling to be simultaneously marked with a single marking effort at any selected interval. The present guide also receives a center punch for positioning of the guide over an indentation in the workpiece to be drilled. Subsequent vertical drilling is accomplished while the guide is manually held in place. Drill guide material such as wood serves to insulate the user's hand against extreme guide temperatures resulting from repeated boring operations.

Important objectives include the provision of a drill guide for use in drilling dowel receiving bores in a manner assuring precise alignment required when setting dowels without tedious repeated clamping of the guide in place; the provision of a drill guide for boring dowel receiving bores in both edges as well as large surface areas remote from workpiece edges; the provision of a drill guide utilizing multiple, friction enhanced surfaces for different drilling operations all without the use of clamping devices; the provision of a drill guide held in place with the user's hand in a safe manner and with the hand protected from adverse temperatures; the provision of a drill guide having a base equipped with a frictional surface to permit the guide to be moved in a somewhat restrained manner along a workpiece surface to locate the center of a center punch carried by the drill guide for proper positioning of the guide over an intended drilling site.

BRIEF DESCRIPTION OF THE DRAWINGS

In the accompanying drawings:

FIG. 1 is a perspective view of the present drill guide operatively disposed on the edge of a workpiece;

FIG. 2 is a perspective view of the drill guide turned end-for-end and inverted from the position shown in FIG. 1;

FIG. 3 is an elevational view of a workpiece equipped with dowel points for the purpose of marking a second workpiece preparatory to drilling;

FIGS. 4 and 5 are perspective views of the present guide and disposed for guide locating on a workpiece and drilling operations respectively.

DETAILED DESCRIPTION OF THE PREFERRED EMBODIMENTS

With continuing attention to the drawings wherein applied reference numerals indicate parts similarly hereinafter identified, the reference numeral 1 indicates generally the present drill guide.

The drill guide comprises a main body having first and second members 2 and 3 integral with one another and forming a polyhedron. Member 2 has an end face 4 overlain by an expanse of grit friction enhancing means 5 such as sandpaper suitably affixed to the face. A lesser face at 6 is disposed on the opposite end of the first member and receives like grit friction enhancing means 7. A drill guideway or opening at 8 extends through the first member and may be provided with a wear resistant sleeve 9.

The second member 3 of the drill guide main body includes face 10, perpendicular to face 6 of the first member, and equipped with an expanse of grit friction enhancing means 11 such as sandpaper. A slot 12 in the second member is in communication with a sight opening 13 which permits drill guide placement on pencil markings at 14 drawn on a workpiece board surface B1. To assure proper alignment of the bores being drilled, the markings 14 are simultaneously drawn on the boards to be doweled while same are in edgewise abutment. As shown in FIG. 1, the marked line 14 when viewed through slot 12 assures accurate drill guide placement on the workpiece. Aluminum oxide #40 grit, cloth back, pressure adhesive sheet material is the preferred friction material with the guide being made from a hardwood.

For forming bores in large surface areas remote from a workpiece edge, such as viewed in FIGS. 4 and 5, the present drill guide lends itself to use with a center punch tool at 16. With attention to FIG. 3, dowel points at 17 are temporarily fitted into bores at 18 in board surface B2 with the points subsequently brought into forceful contact with a board surface B3 to form indentations 20. The drill guide 1 is thereafter properly centered over each indentation by use of center punch 16 by seating the punch point in the indentation. The drill guide is then manually biased downwardly to engage friction enhancing surface 5 with the board or workpiece, the center punch removed and the drilling operation performed.

The length of guideway 8 is adequate to confine the drill to assure the bore is formed perpendicular to the board surface.

The use of sandpaper is desirable in that the same preserves the smooth surface finish of the workpiece.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A drill guide for manual retention on a workpiece having right angular intersecting surfaces and comprising in combination, a main body having first and second perpendicularly orientated faces, said main body defining through openings one in each of said faces, a wear resistant sleeve in one of said openings for receiving a drill and the other of said openings being for the viewing of a marking on the workpiece, and grit friction enhancing means in place on said faces and engageable with the workpiece during guide use to inhibit movement of the guide.

2. The drill guide claimed in claim 1 wherein said main body is of wood and having low heat conductance.

3. The drill guide claimed in claim 1 wherein said main body includes an end face, additional grit friction enhancing means in place on said end face to inhibit movement of the guide when drilling a hole in one of said surfaces of the workpiece.

4. The drill guide claimed in claim 1 wherein said grit friction enhancing means is aluminum oxide carried by a cloth back having pressure adhesive thereon.

* * * * *